United States Patent

Greene

[15] 3,663,888

[45] May 16, 1972

[54] ALL-FET LINEAR VOLTAGE DIFFERENCE AMPLIFIER

[72] Inventor: Richard M. Greene, Smithtown, N.Y.

[73] Assignee: GTE Laboratories Incorporated

[22] Filed: Feb. 16, 1970

[21] Appl. No.: 11,598

[52] U.S. Cl.............................330/18, 330/30 R, 330/30 D, 330/35

[51] Int. Cl...........................................................H03f 3/16

[58] Field of Search...................330/18, 30, 30 D, 35, 38 M; 307/304

[56] References Cited

UNITED STATES PATENTS

| | | | |
|---|---|---|---|
| 3,569,732 | 3/1971 | Christensen | 307/304 X |
| 3,436,621 | 4/1969 | Crawford | 307/304 X |
| 3,515,901 | 6/1970 | White | 307/304 X |

OTHER PUBLICATIONS

Lohman, " Applications of Mos Fets in Microelectronics," SCP and Solid State Technology, March 1966, pp. 23- 29, 307- 304

*Primary Examiner*—Roy Lake
*Assistant Examiner*—James B. Mullins
*Attorney*—Irving M. Kriegsman

[57] ABSTRACT

A linear voltage difference amplifier circuit which utilizes a plurality of field-effect devices having substantially identical operating characteristics. The devices are connected in a series arrangement with the source electrode of each device coupled to the drain electrode of its adjacent device. Each of the devices except a first and a second of the devices has its gate electrode coupled to its drain electrode. Input terminals are coupled to the gate electrodes of the first and second devices and an output terminal is coupled to the drain electrode of one of the devices. In one embodiment of the invention the amplifier consists of three devices and the output voltage is equal to the voltage applied to the first input terminal minus twice the voltage applied to the second input terminal.

6 Claims, 10 Drawing Figures

*INVENTOR.*
RICHARD GREENE

M. Novack
*ATTORNEY.*

INVENTOR.
RICHARD GREENE

M. Novack
ATTORNEY.

INVENTOR.
RICHARD GREENE

M. Novack
ATTORNEY.

connected to the drain electrode $d$ of $Q_D$. The output voltage of the amplifier, $e_{out}$, is taken at this connection point. A bias voltage $V_B$ is applied between the drain electrode of $Q_L$ and source electrode of $Q_D$ which is at ground reference potential. The substrate of each MOSFET (not shown) is at ground potential as is the normal practice for devices fabricated on the same substrate. The input voltage $e_{in}$ is applied to the gate electrode $g$ of $Q_D$. The devices $Q_L$ and $Q_D$ both operate in their saturation regions which operation is attained by applying an appropriate bias voltage $V_{BL}$ to the gate electrode of $Q_L$ and by constraining $e_{in}$ to an appropriate range of voltages.

With both MOSFETS operating in saturation, the following relationships can be set forth:

$$i_L = K_L(V_{gsL} - V_{thL})^2$$
$$i_D = K_D(V_{gsD} - V_{thD})^2$$

wherein:

$i_L$ is the drain-to-source current of $Q_L$
$K_L$ is the gain constant of $Q_L$
$V_{thL}$ is the threshold voltage of $Q_L$
$V_{gsL}$ is the gate-to-source voltage of $Q_L$
$i_D$ is the drain-to-source current of $Q_D$
$K_D$ is the gain constant of $Q_D$
$V_{thD}$ is the threshold voltage of $Q_D$, and
$V_{gsD}$ is the gate-to-source voltage for $Q_D$.

It can be seen by inspection that $V_{gsL} = V_{BL} - e_o$ and that $V_{gsD} = e_{in}$. Since there is no appreciable gate current for either device the currents $i_D$ and $i_L$ are substantially equal and can be equated and solved to yield the following:

$$e_o = -\sqrt{(K_D/K_L)}\, e_{in} + V_{BL} + \sqrt{(K_D/K_L)}\, V_{thD} - V_{thL}.$$

Differentiating this equation yields the circuit voltage gain as follows:

$$\partial e_o/\partial e_{in} = -\sqrt{K_D/K_L}$$

From this gain equation it is seen that for identical $Q_L$ and $Q_D$ a voltage gain of $-1$ is obtained. In this case the amplifier is thermally stable since the terms in the equation for $e_o$ which depend upon threshold voltage cancel. However, to achieve a voltage gain having a magnitude other than unity with this circuit configuration it is necessary to utilize a pair of non-identical devices having different gain constants.

The gain constant of a MOSFET can be represented by the general formula $$K = (u\epsilon_g W/2t_g S)$$

where:

$u$ is the carrier mobility in the semiconductor material
$\epsilon_g$ is the dielectric constant of gate insulation
$W$ is the width of the device channel
$S$ is the length of the device channel and
$t_g$ is the thickness of the gate insulation.

When the devices $Q_L$ and $Q_D$ are fabricated in close proximity on the same substrate, the values of $u$, $\epsilon_g$ and $t_g$ are generally the same for each device. Variations in the geometrical factors $W$ and $S$ are therefore used to achieve the desired gain. For example, a voltage gain of $-2$ can be achieved by making the width of the driver MOSFET channel ($W_D$) four times as large as the width of the load MOSFET channel ($W_L$) while keeping other parameters identical. In this case it is seen that the voltage gain reduces to $-\sqrt{(W_D/W_L)}$ which equals the desired value of $-2$. The above equation for $e_o$ indicates, though, that this amplifier would not be thermally stable as the terms "$\sqrt{(K_D/K_L)}\, V_{thD}$" and "$-V_{thL}$" would generally change by different amounts with changes in temperature.

Referring now to FIG. 2 there is shown a linear voltage difference amplifier circuit 20 in accordance with the invention. Field-effect transistors $Q_1$, $Q_2$ and $Q_3$ have substantially identical operating characteristics and are connected in a series arrangement with the drain electrode of $Q_1$ coupled to the source electrode of $Q_2$ and the drain electrode of $Q_2$ coupled to the source electrode of $Q_3$. The transistors of FIG. 2 and subsequent embodiments are each depicted as MOSFETS but the invention applies generally to all field-effect devices which exhibit square law characteristics. The source electrode of $Q_1$ is coupled to ground reference potential and the drain electrode of $Q_3$ is coupled to a bias voltage $V_B$. (All voltages are measured with respect to ground potential.) The gate electrode of $Q_2$ is coupled to its drain electrode. Input voltages $e_1$ and $e_3$ are applied to the gate electrodes of $Q_1$ and $Q_3$, respectively, and an output voltage $e_{out}$ is measured at the drain electrode of $Q_1$.

For linear operation of the difference amplifier the field-effect devices should operate in their saturation regions so that each device exhibits square law characteristics. In general, a MOSFET will operate in its saturation region whenever $V_{th} < V_{gs} \leq V_{ds} + V_{th}$ where $V_{ds}$ and $V_{gs}$ are the drain-to-source and gate-to-source voltages of the device and $V_{th}$ is the threshold voltage of the device. It is seen that $Q_2$ will therefore operate in saturation since for this device $V_{ds}$ equals $V_{gs}$ and the above condition is met. In addition, by limiting the input voltages to ranges of values $V_{th} < e_1 \leq ((e_3+V_{th})/3)$ and $3V_{th} < e_3 \leq V_B + V_{th}$ the transistors $Q_1$ and $Q_3$ are also constrained to operation in their saturation regions.

The drain current in each device of amplifier 20 is substantially equal since virtually no gate current flows in the MOSFET devices. With each device operating in the saturation region, the following square-law relationships (assuming negligible drain-to-source saturation leakage) are in effect:

$$i_D = K(V_{gs1} - V_{th})^2$$
$$i_D = K(V_{gs2} - V_{th})^2$$
$$i_D = K(V_{gs3} - V_{th})^2$$

where:

$i_D$ is the drain current through each device,
$K$ is the gain constant of each device,
$V_{th}$ is the threshold voltage of each device, and
$V_{gs1}$, $V_{gs2}$, $V_{gs3}$ are the gate-to-source voltages of $Q_1$, $Q_2$, $Q_3$ respectively.

It should be noted that the values of $K$ and $V_{th}$ for each device are the same since substantially identical devices are being used. This is preferably achieved in practice by fabricating the devices in close proximity on the same semiconductor wafer. The above relationships are simultaneously satisfied only if $V_{gs1} = V_{gs2} = V_{gs3}$. Since $V_{gs1} = e_1$, it is seen that $V_{gs2} = V_{gs3} = e_1$. The voltage drop across the series arrangement can be expressed by the equation $$V_B = V_{ds1} + V_{ds2} + V_{ds3} \qquad (1)$$

where $V_{ds1}$, $V_{ds2}$ and $V_{ds3}$ are the drain-to-source voltages of $Q_1$, $Q_2$ and $Q_3$, respectively. Noting that $V_{ds1} = e_{out}$ and $V_{ds2} = V_{gs2} = e_1$, Equation (1) can be rewritten as $$e_{out} = V_B - e_1 - V_{ds3} \qquad (2)$$

The voltages associated with $Q_3$ can be expressed by the equation $$V_B - V_{ds3} = e_3 - V_{gs3} \qquad (3)$$

Since $V_{gs3} = e_1$, Equation (3) can be rewritten as $$V_{ds3} = V_B + e_1 - e_3 \qquad (4)$$

Substituting the value of $V_{ds3}$ from Equation (4) in Equation (2) yields $$e_{out} = e_3 - 2e_1 \qquad (5)$$

Differentiating Equation (5) with respect to $e_1$ and $e_3$ yields $$\frac{\partial e_{out}}{\partial e_1} = -2 \text{ and } \frac{\partial e_{out}}{\partial e_3} = 1.$$

It is therefore seen that the circuit produces gains of $-2$ and 1 with respect to the two inputs. This is achieved using three substantially identical field-effect devices. The circuit is thermally stable since the equation for $e_{out}$ does not depend upon threshold voltages which vary with temperature.

The output voltage of difference amplifier 20 as derived from the above equations can be alternatively visualized by keeping in mind that with the devices operating in saturation the gate-to-source voltages of $Q_2$ and $Q_3$ must "track" the voltage $e_1$. This being the case, the voltage at the source electrode of $Q_3$ must be $e_3 - e_1$. Note that this is also the voltage at the gate electrode of $Q_2$. It follows that the voltage at the source electrode of $Q_2$ (i.e., $e_{out}$) must equal $e_3 - 2e_1$ for the tracking constraint to be met.

The foregoing analyses can be similarly applied to the voltage difference amplifiers shown in FIGS. 3 and 4. The amplifier 30 of FIG. 3 is like the previous amplifier 20 except that input terminals are coupled to the gate electrodes of $Q_2$ and $Q_3$ and the gate electrode of $Q_1$ is coupled to its drain electrode.

ALL-FET LINEAR VOLTAGE DIFFERENCE AMPLIFIER

BACKGROUND OF THE INVENTION

This invention relates to difference amplifier circuits and, more particularly, to an all-FET linear voltage difference amplifier circuit.

In designing integrated circuits a common objective is to minimize the use of passive components such as resistors, which require relatively large surface areas, while maximizing the use of active components which are usually significantly smaller. This is one reason that the field-effect transistor (FET), and especially the insulated gate field-effect transistor (IGFET), has become a widely used active component for integrated circuits.

A FET consists of a substrate of semiconductor material having regions therein denoted as "source" and "drain." A carrier conduction channel lies between these regions and the conductance of this channel is controlled by an electric field. In an insulated-gate field-effect transistor (IGFET) a control electrode known as a "gate" overlies the channel and is separated therefrom by a region of insulating material. Voltages applied between the gate electrode and the semiconductor substrate control the conductance of the channel by field effect. A "metal-oxide-semiconductor field-effect transistor" (MOSFET) is a type of IGFET in which the insulating material is an oxide layer and the gate is an overlying metal layer. The MOSFET generally requires less surface area and fewer manufacturing steps than the conventional bipolar transistor.

A voltage amplifier which utilizes a FET in series with a fixed load resistor produces an output voltage which varies as a nonlinear function of the input voltage. This nonlinearity is due to the nonlinear transfer characteristic of a FET device which, when operated in its saturation region, exhibits "square law" gain characteristics. This means that the drain-to-source current through the device varies as the square of the gate voltage applied to the device. To achieve a linear output it has been suggested that a second FET (a "load FET") be employed in place of the fixed load resistor. With this scheme, the load FET is coupled in series with the first mentioned FET (called the "driver FET") so that the same drain-to-source current flows through each device. Since both devices have substantially "square law" characteristics their nonlinear characteristics offset each other and a linear output voltage is obtained. As will be demonstrated below, a voltage gain having unity magnitude is obtainable from such a linear amplifier when two identical FET devices are employed. To obtain a non-unity gain from this circuit it is necessary to employ two FET devices having different individual gain constants. This can be achieved by utilizing devices of differing geometries. For example, as will be seen below, by using a driver MOSFET which has a channel width four times greater than that of a load MOSFET a gain magnitude of two can be obtained.

There are disadvantages, however, in using devices of differing geometries to make a voltage amplifier, especially in integrated circuit technology. From a manufacturing standpoint it is easier and therefore more desirable to fabricate a number of identical devices on a substrate. Furthermore, when devices of different geometries are fabricated on the same substrate manufacturing errors tend to degrade performance of a circuit using such devices more than if identical devices had been used. To illustrate, it can be noted that with identical devices an error in a manufacturing step will likely lead to "consistent errors," i.e., equivalent parameter deviations in each device. For example, if a given dimension of each device is in error by a fixed amount each device will have a certain percentage error in performance, but the devices will still be substantially identical. With non-identical devices, however, such errors tend to affect the individual devices in different ways. For example, if a dimension of each device is in error by a given amount there will likely be a largest percentage error in the performance of the device of smallest geometry.

An additional disadvantage in using devices of differing geometries is the lack of thermal stability of the voltage amplifier. As will be seen below, the expression for the output voltage of the two-device amplifier previously described contains terms for the threshold voltage of each device. When identical devices are used, these threshold voltage terms cancel out. When non-identical devices are used, the output voltage is affected by unlike variations in the threshold voltages of the two devices. Therefore, since threshold voltage is temperature dependent, variations in temperature will cause an undesirable drifting of the amplifier output voltage.

The circuit of the instant invention utilizes a number of identical devices and achieves gains other than unity without sacrificing temperature stability. Also, the gain of the disclosed circuit is not substantially affected by like dimensional variations in each device as often occurs in integrated circuit manufacture. The circuit is therefore particularly suitable for fabrication in integrated circuit form.

A circuit which also utilizes a number of identical FET devices and achieves non-unity gain is disclosed in my copending U. S. application Ser. No. 11,599 filed Feb. 16, 1970 assigned to the same assignee as the present invention. In the circuit of the referenced application a single input voltage is received and amplified. The circuit of the present invention is adapted to receive two input voltages and produce various forms of difference voltages as between the two input voltages.

SUMMARY OF THE INVENTION

The present invention is directed to a voltage difference amplifier which includes a plurality of at least three field-effect transistor devices having substantially identical operating characteristics. The devices are connected in a series arrangement with the source electrode of each device coupled to the drain electrode of the next device in the arrangement. The source electrode of the device at one end of the series arrangement and the drain electrode of the device at the other end of the arrangement define the "source end" and the "drain end," respectively, of the series arrangement. Each of the devices except a first and second of said devices has its gate electrode coupled to its drain electrode. First and second input terminals are coupled to the gate electrodes of the first and second devices, respectively. Means are provided for applying a bias voltage between the drain end and the source end of the series arrangement. In addition, an output terminal is coupled to the drain electrode of one of the devices.

The output voltage of the disclosed difference amplifier circuit depends upon the number of devices in the arrangement and also upon the positions of the input and output terminals.

In a preferred embodiment of the invention the arrangement consists of three devices and the first and second devices are at the drain end and source end, respectively, of the arrangement. The output terminal is coupled to the drain electrode of the second device. In this embodiment the output voltage is equal to the voltage applied to the first input terminal minus twice the voltage applied to the second input terminal.

Further features and advantages of the invention will become more readily apparent from the following detailed description when taken in conjunction with the accompanying drawings.

DESCRIPTION OF THE PREFERRED EMBODIMENTS

Figure 1:
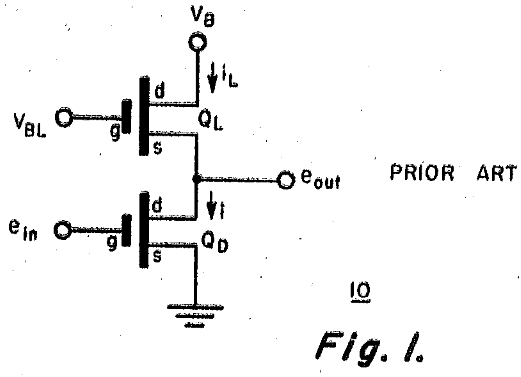
PRIOR ART Fig. 1.
FIG. 1 is a schematic diagram of a prior art amplifier circuit.
Figure 2:
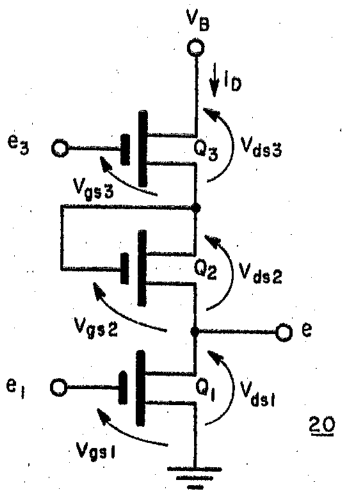
FIGS. 2–10 are schematic circuit diagrams of embodiments of the invention.
Figure 3:
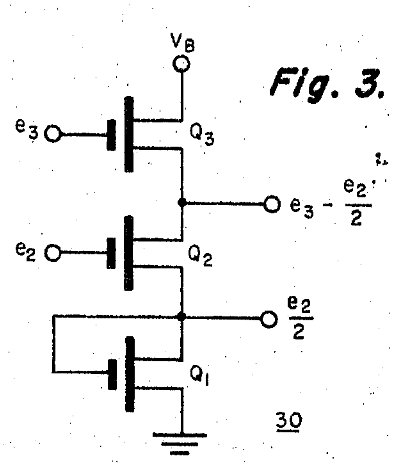

Before describing the present invention in detail, it will be helpful to understand the functioning of a prior art linear amplifier which utilizes two series connected MOSFETS. FIG. 1 shows an amplifier circuit 10 consisting of a "driver transistor" $Q_D$ and a "load transistor" $Q_L$. The devices $Q_D$ and $Q_L$ are arranged in series with the source electrode $s$ of $Q_L$ (It is assumed in this and subsequent circuits that the input voltages are within the above described ranges required for operation of the devices in saturation and also that drain-to-source saturation leakage currents are negligible.) The voltage "tracking" constraint in this circuit requires that each device have a gate-to-source voltage of $(e_2/2)$. This condition can be visualized by realizing that the total of the gate-to-source voltages of $Q_1$ and $Q_2$ is $e_2$. Since these gate-to-source voltages must be equal, they must each be $e_2/2$). As indicated in FIG. 3, the voltage at the source of $Q_3$ must therefore equal $e_3-(e_2/2)$ so that all gate-to-source voltages equal $(e_2/2)$.

Figure 4:
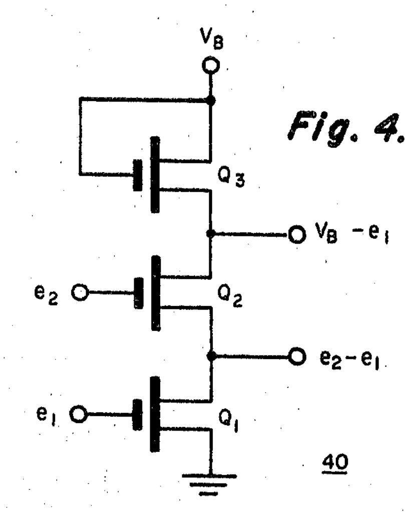
Figure 5:
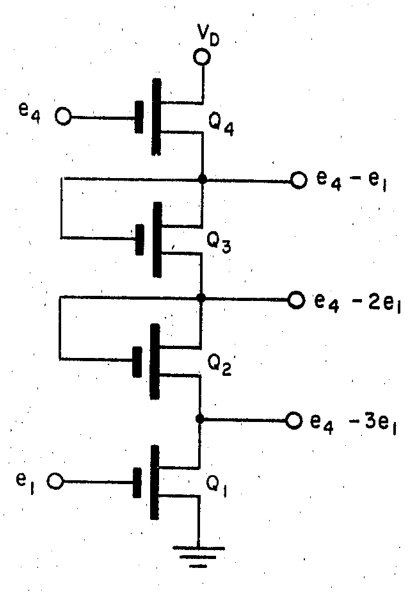
Figure 6:
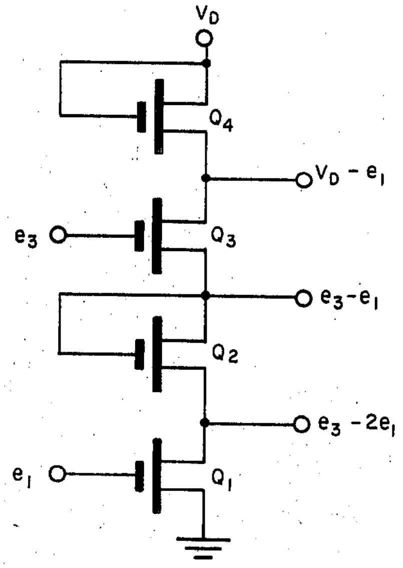
Figure 7:
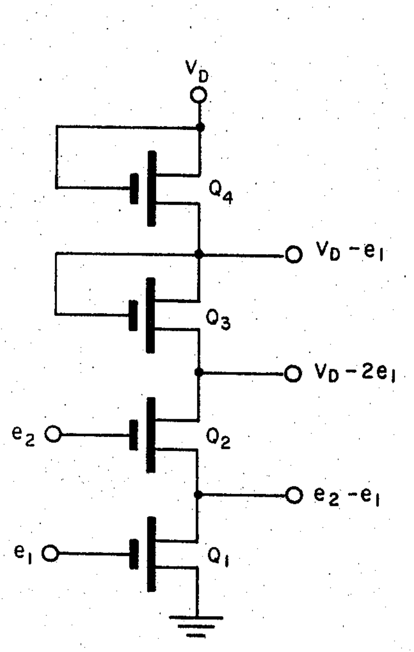
Figure 8:
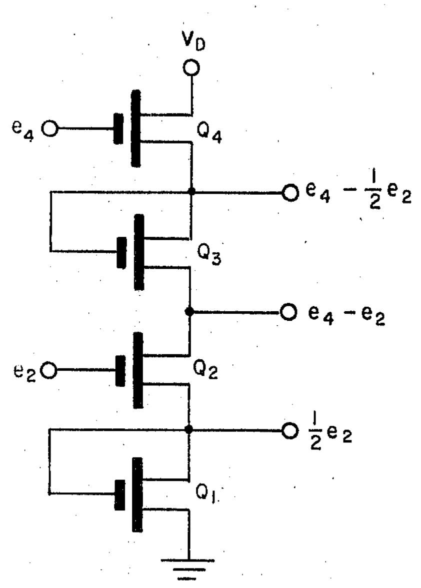
Figure 9:
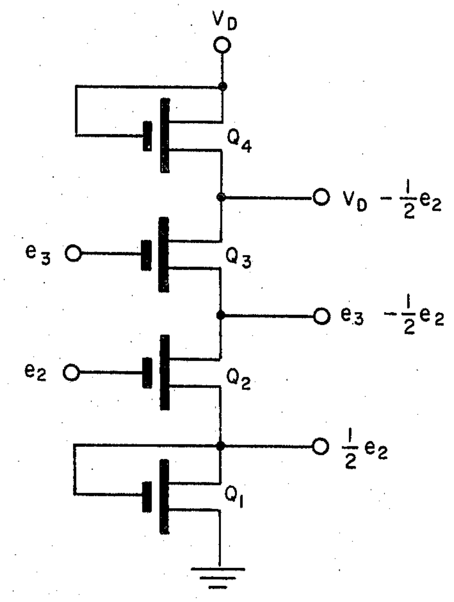
Figure 10:
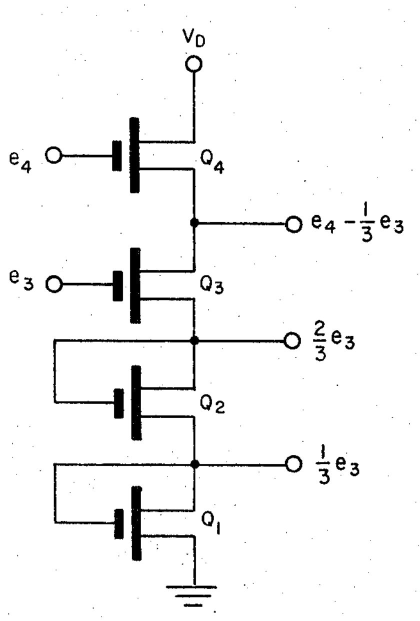

In amplifier 40 of FIG. 4, the gate-to-source voltages must each equal $e_1$. The indicated output voltages satisfy this condition. It is seen that the gate electrode of $Q_3$ is fixed at $V_B$ so the source electrode of $Q_3$ must be at a voltage $V_B-e_1$.

FIGS. 5 through 10 illustrate embodiments of the invention which utilize four FET devices having substantially identical operating characteristics. In each case input terminals are coupled to the gate electrodes of two of the devices. The other two devices have their gate electrodes coupled to their drain electrodes. The voltages which are applied to the input terminals have been given the same numerical designations as the devices to which they are applied. For example, in FIG. 5, input voltages designated $e_1$ and $e_4$ are applied to devices $Q_1$ and $Q_4$, respectively. Each of the FIGS. 5–10 indicate the voltages which appear at the possible output terminals.

It will be appreciated that additional devices can be connected in the manner disclosed to obtain various other difference voltage outputs. For example, with a five device series arrangement an output is available which is equal to one of the inputs minus four times the other input. In a practical sense, however, the number of devices in an arrangement is limited by the buildup of threshold voltages which necessitate the use of increasingly higher bias voltages for longer arrangements.

What is claimed is:

1. A voltage difference amplifier comprising:
   a. first, second and third field-effect devices having substantially identical operating characteristics, each of said devices having drain, source and gate electrodes, said devices being connected in a series arrangement with the source electrode of each device coupled to the drain electrode of the next device in the arrangement, said series arrangement having a source end and a drain end, the first device being at the source end of the series arrangement, the second device being at the drain end of the series arrangement and the third device having its gate electrode coupled to its drain electrode;
   b. first and second input terminals coupled to the gate electrodes of said first and second devices;
   c. means for applying a bias voltage between the drain and source ends of said series arrangement; and
   d. an output terminal coupled to the drain electrode of the first device.

2. The voltage difference amplifier as defined by claim 1 further comprising means for applying first and second input voltages to said first and second input terminals, said input voltages being of sufficient magnitude such that said first and second devices operate in their saturation regions whereby the voltage at said output terminal is substantially equal to said second input voltage minus twice said first input voltage.

3. The voltage difference amplifier as defined by claim 2 wherein said field-effect devices are substantially identical MOS field transistors.

4. A voltage difference amplifier comprising:
   a. first, second and third field-effect devices having substantially identical operating characteristics, each of said devices having drain, source and gate electrodes, said devices being connected in a series arrangement with the source electrode of each device coupled to the drain electrode of the next device in the arrangement, said series arrangement having a source end and a drain end, the first device being in the middle of the series arrangement, said second device is at the drain end of said series arrangement, and the third device having its gate electrode coupled to its drain electrode;
   b. first and second input terminals coupled to the gate electrodes of said first and second devices;
   c. means for applying a bias voltage between the drain and source ends of said series arrangement; and
   d. an output terminal coupled to the drain electrode of the first device.

5. The voltage difference amplifier as defined by claim 4 further comprising means for applying first and second input voltages to said first and second input terminals, said input voltages being of sufficient magnitude such that said first and second devices operate in their saturation regions whereby the voltage at said output terminal is substantially equal to said second input voltage minus half said first input voltage.

6. The voltage difference amplifier as defined by claim 5 wherein said field-effect devices are substantially identical MOS field effect transistors.

* * * * *